(12) United States Patent
Haldimann

(10) Patent No.: US 6,179,109 B1
(45) Date of Patent: Jan. 30, 2001

(54) CONVEYOR DEVICE FOR SHELF CHANNELS IN SHELF-STORAGE SYSTEMS

(75) Inventor: Hans-Rudolf Haldimann, Lugano (CH)

(73) Assignee: Gilgen Fordersysteme, Oberwangen (CH)

( * ) Notice: Under 35 U.S.C. 154(b), the term of this patent shall be extended for 0 days.

(21) Appl. No.: 09/171,253

(22) PCT Filed: Jan. 21, 1998

(86) PCT No.: PCT/CH98/00018

§ 371 Date: Oct. 15, 1998

§ 102(e) Date: Oct. 15, 1998

(87) PCT Pub. No.: WO98/39235

PCT Pub. Date: Sep. 11, 1998

(30) Foreign Application Priority Data

Mar. 3, 1997 (CH) ........................................ 501/97

(51) Int. Cl.[7] ................................................. B65G 13/00
(52) U.S. Cl. ..................... 193/35 R; 193/35 R; 193/34; 193/38; 193/2 R; 193/3; 193/4; 193/25 FT; 193/37; 198/750.4; 198/850; 198/817; 198/468.11; 198/740; 198/744; 198/747; 198/748
(58) Field of Search .................... 193/35 R, 34, 193/38, 2 R, 3, 4, 25 FT, 37; 198/750.4, 850, 817, 468.9, 468.11, 740, 744, 747, 748

(56) References Cited

U.S. PATENT DOCUMENTS

| 2,199,500 | * | 5/1940 | Levai . | |
| 2,990,941 | * | 7/1961 | Peras . | |
| 3,589,534 | * | 6/1971 | Brown | 414/592 |
| 3,695,464 | * | 10/1972 | Kaji | 414/277 |
| 3,972,408 | * | 8/1976 | Seragnoli | 198/456 |
| 4,136,766 | * | 1/1979 | Pryor et al. | 198/485 |
| 4,349,101 | * | 9/1982 | Eldred et al. | 198/851 |
| 4,515,578 | * | 5/1985 | Burger | 474/231 |
| 4,688,670 | * | 8/1987 | Lapeyre | 198/853 |
| 4,856,955 | * | 8/1989 | Yaguchi et al. | 414/278 |
| 4,865,183 | * | 9/1989 | Hodlewsky et al. | 198/834 |
| 5,305,871 | * | 4/1994 | Scherer | 198/737 |
| 5,320,582 | * | 6/1994 | Takeda | 474/140 |
| 5,370,215 | * | 12/1994 | Markin et al. | 198/346.1 |
| 5,538,384 | * | 7/1996 | Haldimann | 414/286 |
| 5,681,138 | * | 10/1997 | Lust et al. | 414/225 |
| 5,694,993 | * | 12/1997 | Cameron | 144/245.1 |
| 5,735,387 | * | 4/1998 | Polaniec et al. | 198/690.1 |
| 5,755,847 | * | 5/1998 | Quayle | 65/260 |

FOREIGN PATENT DOCUMENTS

| 3442111 | 7/1986 | (DE) . |
| 0343111 | 11/1989 | (EP) . |
| 1346528 | 10/1987 | (RU) . |

* cited by examiner

Primary Examiner—Christopher P. Ellis
Assistant Examiner—Jeffrey A. Shapiro
(74) Attorney, Agent, or Firm—Tarolli, Sundheim, Covell, Tummino & Szabo L.L.P.

(57) ABSTRACT

A conveying apparatus (1) for shelf channels of shelf storage facilities comprises two parallely arranged, circulating conveying means (2) for receiving pallets (P). The conveying means (2) are partially designed as support roller chains (3) whose ends are interconnected by a rope (3). Two deflections (5, 6) are provided per conveying means (2) by means of which the particular conveying means is divided into an upper (7) and a lower run (8). In order to bring the two conveying means into a defined initial position after unloading the last pallet, several chain links (3A, 3B, 3C, 3D) of the end region of the particular chain (3) near the unloading end are provided with a smooth surface. Moreover, an end stop member (15, 16) is provided for each conveying means (2) that limits the path of displacement of the chain (3) in the unloading direction. Finally, both conveying means (2) are provided in their beginning region near the loading end with a entrainment member (12) that ensures a non-positive and/or positive connection in loading direction between the conveying means (2) and the first pallet (P) to be loaded.

10 Claims, 3 Drawing Sheets

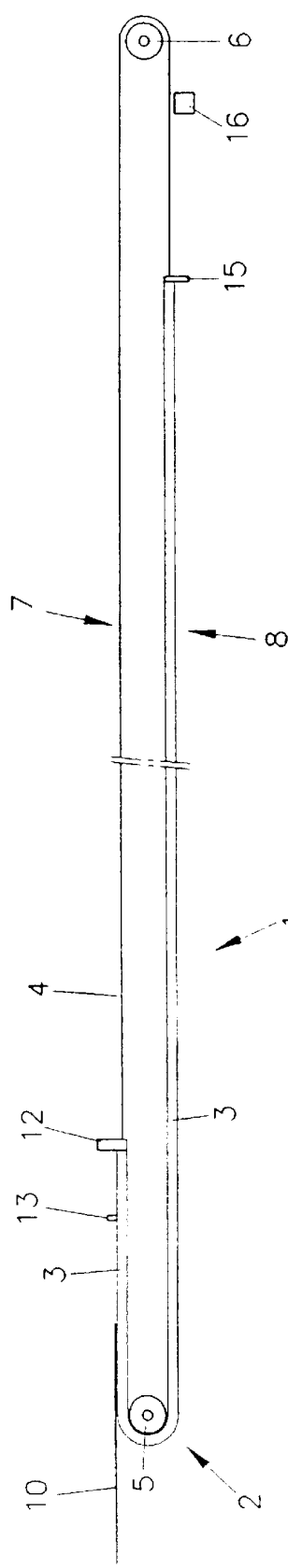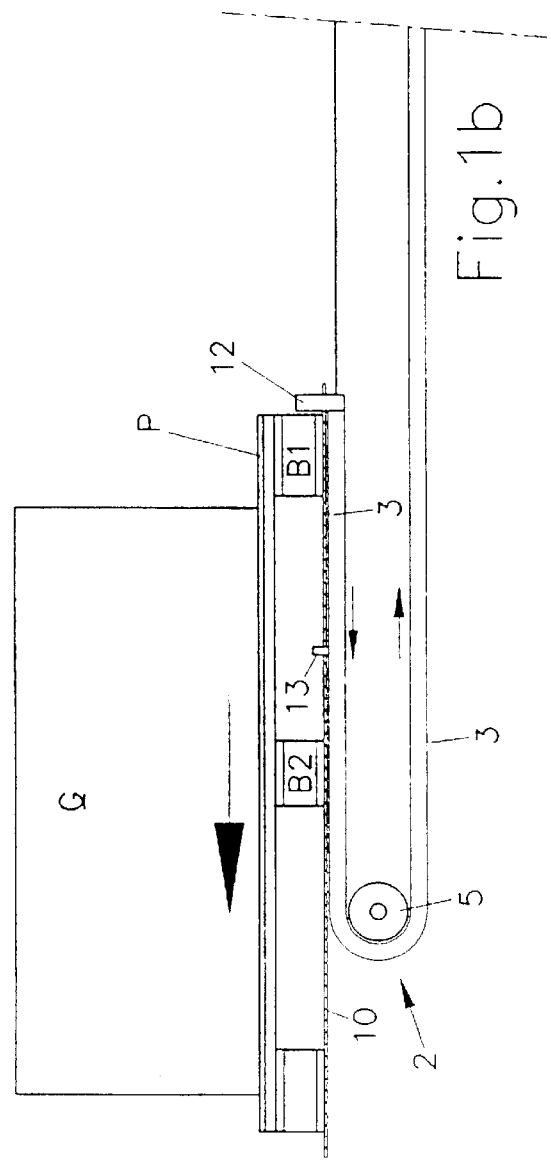

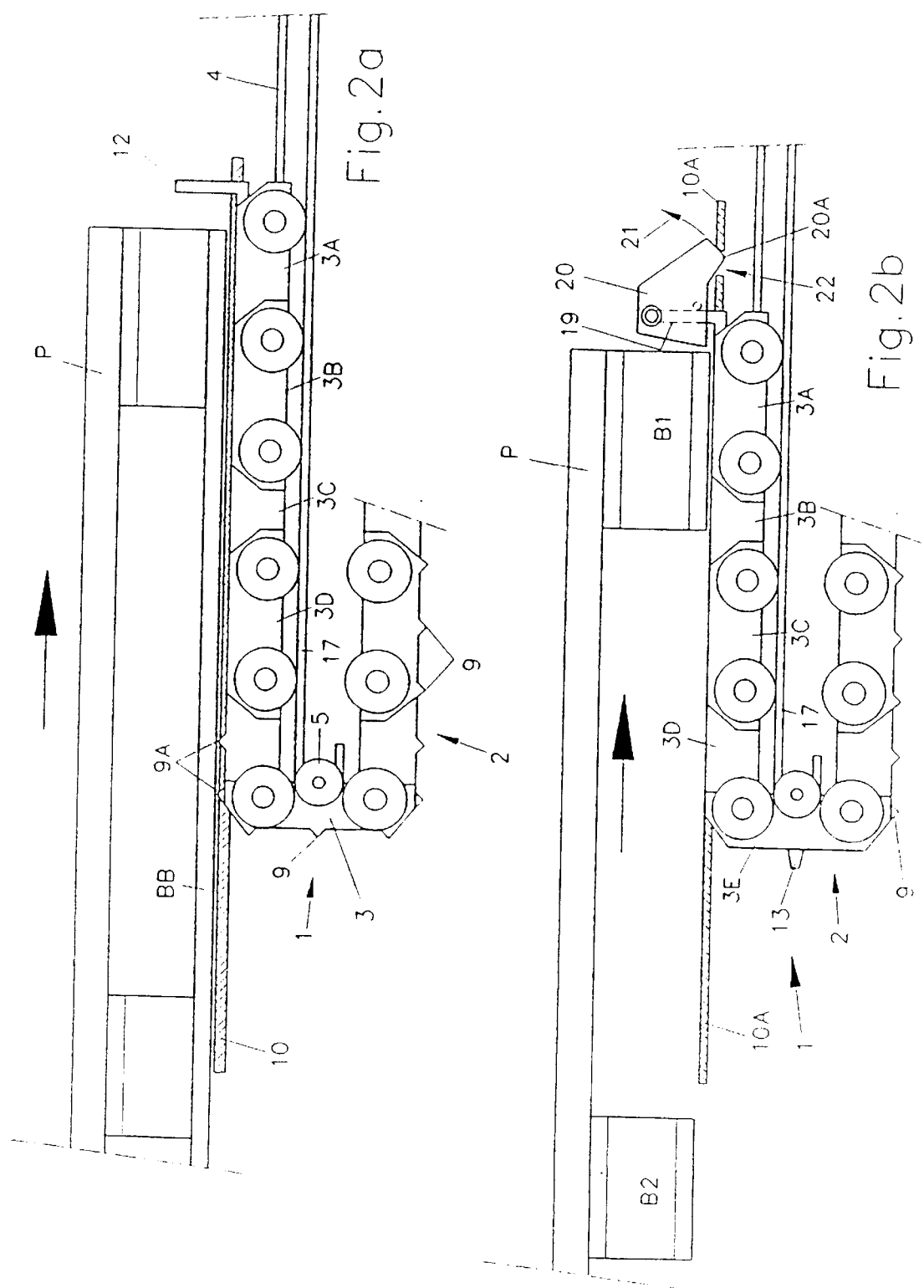

CONVEYOR DEVICE FOR SHELF CHANNELS IN SHELF-STORAGE SYSTEMS

FIELD OF THE INVENTION

The invention refers to a conveyor device for shelf channels in shelf-storage systems.

BACKGROUND OF THE INVENTION

Conveying apparatuses for shelf channels of shelf storage facilities of the kind discussed herein usually comprise two circulating conveying means arranged parallel to each other by means of which the goods in the particular shelf channels can be loaded and also unloaded again. The conveying means are not driven, but are displaced by an unloading vehicle, for instance a fork lift truck, upon loading and unloading the goods. Usually, one half of the conveying means is designed as a roller chain or a support roller chain, while the other half consists of a rope that interconnects the chain to a continuously circulating conveying means. Such a design lowers the costs and saves weight as compared to a conveying means that is entirely constituted by a chain.

As the two conveying means of a shelf channel are not coupled to each other, the danger exists that they are displaced relative to each other. One reason for such a displacement can consist in the fact that the first pallet is put in a skewed and/or offset manner onto the particular conveying means upon loading. Another reason for such a displacement is that the last pallet is unloaded in a skewed or offset manner. Such errors can add in time to a large relative offset between the two conveying means. Finally, this can lead to a situation in which stored goods rest not only on the chain, but partially on the rope interconnecting the free ends of the chain. It is understood that this is unwelcome and can lead to malfunctions and defects.

Thus, it is the object of the invention to suggest a conveying apparatus for shelf channels of shelf storage facilities that is put, upon unloading the last pallet, into a defined initial state in which both conveying means are aligned both with reference to each other as well as absolutely.

SUMMARY OF THE INVENTION

In the conveying apparatus designed according to the present invention, the conveying means is entrained up to an end stop member upon unloading the last pallet. Thereafter, the last pallet can be pulled off the chain easily as the last chain links are provided with a smooth surface. Once the last pallet has been unloaded, the two conveying means are aligned parallel to each other. Upon loading a new pallet, it slides over the chain links that are provided with a smooth surface until it abuts against an entrainment device that is provided in the initial region close to the loading end of the particular conveying means. Only then the two conveying means are entrained by the pallet.

In order to make sure that the two conveying means are not entrained by the inserted pallet as long as the pallet has not abutted the entrainment device, in a preferred embodiment, a catch member is suggested that arrests the particular conveying means in the final position.

In a further preferred embodiment, a stationary slide member is suggested that is located in the end region of each shelf channel at the unloading end thereof, the top surface of the slide member at least partially extending above the chain links that have a smooth top surface. Preferably, the top surface of that slide member extends at least partially below the means for ensuring a non-positive connection between the chains and the pallets. By means of such a slide member, upon unloading the last pallet, the chain is entrained by the pallet as long as the last chain links provided with a non-positive connection move downwards at the deflection. In this manner, the two conveying means are paralelly aligned upon unloading the last pallet.

Such a slide member has the further advantage that the moving conveying means and the now frontmost pallet, respectively, can slow down on the slide member upon unloading the in each case frontmost pallet, without the danger that stored goods would be moved beyond the end of the shelf.

BRIEF DESCRIPTION OF THE DRAWINGS

In the following, some embodiments of the conveying apparatus according to the present invention shall be further described, with reference to the accompanying drawings, in which FIG. 1a shows a schematically illustrated conveying means of a shelf channel in a longitudinal section;

FIG. 1b shows a window of the conveying means according to FIG. 1 in an enlarged view, upon unloading the last pallet;

FIG. 2a shows a detailed view of a first embodiment of the conveying means in the region of the deflection at the unloading end; and FIG. 2b shows a detailed view of a second embodiment of the conveying means in the region of the deflection at the unloading end.

DETAILED DESCRIPTION OF THE PREFERRED EMBODIMENTS

Figure 3:
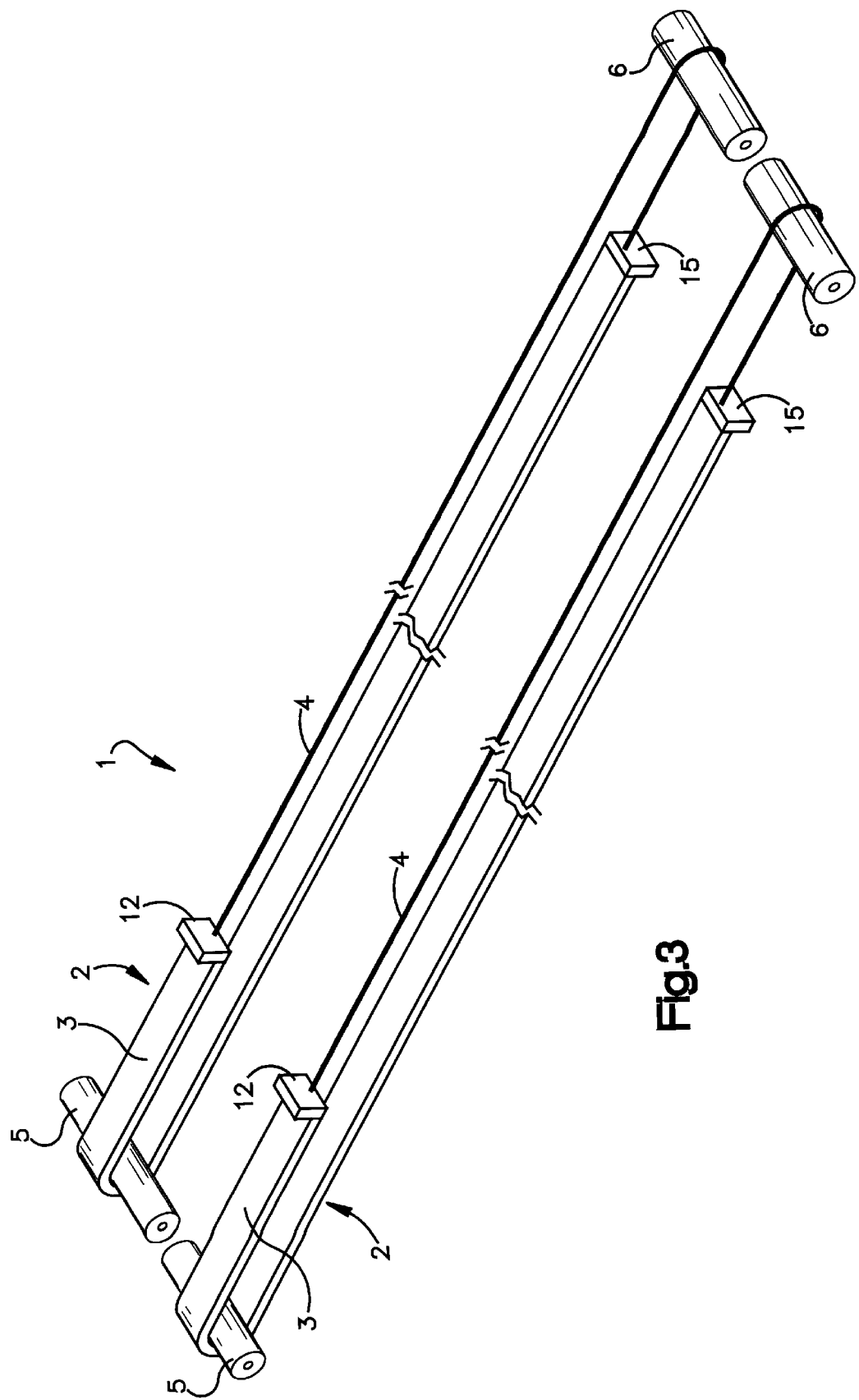
FIG. 3 shows a schematic illustration of two elongated, parallel conveyor means.

FIG. 1a shows a longitudinal section through a schematically illustrated conveying means 2 of a conveying apparatus 1 that is used in a shelf channel of a shelf storage facility.

In order to be able to load and unload the goods one behind the other one in a shelf channel, each shelf channel is provided with a conveying apparatus 1 that essentially consists of two parallel, circulating conveying means 2 as shown schematically in FIG. 3. As the real supporting element of the conveying means 2, there is provided a support roller chain 3, only schematically shown in this drawing. In order to be in a position to optimize costs and weight, the conveying means 2 is designed only by approximately its half as chain 3. The other half is constituted by a rope 4 that is connected to the both end links of the chain 3. For deflecting the conveying means 2, there is provided a front deflection 5 in the region of the loading/unloading end of the shelf channel as well as a rear deflection 6 in the region remote of the loading/unloading end of the shelf channel. By means of these two deflections 5, 6, the conveying means 3 is divided into an upper and a lower run 7, 8. As a track for the upper run 7 of the chain 3, a rail is provided which cannot be seen in this illustration. The lower run 8 of the chain 3 is supported at the lower side of the rail by supporting means not further shown. In the region of the deflection 5 at the loading/unloading end, a slide member 10 is provided that is important for loading and unloading goods.

At the loading/unloading end, the chain 3 is provided with an angled element 12 that serves as a stop member against which the first pallet abuts upon loading whereby a non-positive connection between pallet and conveying means 2 is ensured.

By some chain links in front of the angled element 12, an entrainment device 13 is provided that is designed as a projection and ensures a non-positive connection between pallet and chain upon unloading the last pallet. In order to ensure a non-positive connection between all pallets that are received on the chain 3 and the conveying means 2, the individual chain links are provided with acute projections located on their top sides. However, those chain links that are located between stop member 12 and entrainment device 13 have a smooth upper surface. The design both of the angled element 12 and of the entrainment device 13 will be further explained herein below, with reference to FIGS. 2a and 2b. The slide member 10 located in the region of the deflection 5 at the loading/unloading end preferably is surrounded on both sides by the conveying means 2.

At the end remote from the loading/unloading end, according to the illustration shown in FIG. 1a, the conveying means is provided with an end stop member 15 that is designed to cooperate with a stationary buffer 16 and that limits the path of displacement of the chain 3 in the direction of unloading.

FIG. 1b shows the region of the deflection of the conveying means 2 according to FIG. 1a at the loading/unloading end in an enlarged view, whereby the conveying means 2 is but schematically shown again. With the help of this drawing, the operation of the conveying apparatus upon unloading the last pallet shall be further explained, whereby the conveying apparatus, in the present example, is designed to be used with pallets whose floorboards are not interconnected on a bottom surface, as seen in the longitudinal direction of the conveying means.

Upon unloading the last pallet, the pallet entrains the conveying means 2 until its central floorboard B2 has left the chain 3 and rests on the slide member 10. As the last links of the chain 3 that are located between the entrainment device 13 and the stop member 12 are provided with a smooth surface, the non-positive connection between pallet P and chain 3 is essentially released if only the rearmost floorboard B1 rests on the chain 3. Thus, the pallet P can slide forward on the chain 3. However, as soon as the rearmost floorboard B1 abuts against the entrainment device 13, the non-positive connection is re-established and the chain 3 is entrained again. Upon further displacing the chain 3, the entrainment device moves downwards at the deflection 5 located near the loading/unloading end, whereby the non-positive connection between pallet P and chain 3 is finally released. However, due to the inherent kinetic energy, the chain 3 continues to move further until the end stop member 15 abuts against the buffer 16 (FIG. 1a).

In FIG. 2a, a preferred embodiment of the conveying means is shown in a still further enlarged view of the portion near the deflection at the loading/unloading end, whereby the illustrated conveying means is located a short distance in front of the end position at the loading/unloading end.

The illustrated conveying apparatus 1 shown in FIG. 2a is particularly suitable for pallets with continuous floorboards BB. In this illustration, it can be seen that the first chain link 3A at the loading/unloading end is provided with an angled element 12, that the last four chain links 3A, 3B, 3C, 3D are provided with a smooth surface, and that the remaining chain links are provided with acute projections 9 for ensuring a non-positive connection. The upper surface of the slide member 10 located in the region of the front deflection 5 extends a few millimeters above the upper side of the chain 3 and of the chain links 3A, 3B, 3C, 3D having a smooth surface, respectively. The acute projections 9A tower above the surface of the slide member 10. This design ensures that the chain 3 is entrained upon unloading of the pallet P for as long until the last chain links provided with the acute projections have moved downwards at the deflection 5. Then, the chain 3 continues to move, driven by the kinetic energy, until its end stop member 15 has reached the stationary buffer 16.

Upon loading in the first pallet, the provision of the slide member 10 ensures that the chain 3 is not entrained by the first pallet until the pallet P abuts against the angled element 12.

Instead of the here shown horizontally extending slide member 10, it is understood that a slide member 10 can be provided that extends obliquely or that is provided with a ramp in the region of its beginning.

FIG. 2b shows an alternative embodiment of a conveying apparatus, as compared to the one shown in FIG. 2a. In the present example, the upper surface of the slide member 10A extends approximately in the same height as the surface of the last chain links 3A, 3B, 3C, 3D that are provided with a smooth surface. In order to arrest the conveying means 2 in its end position, a catch lever 20 is provided that is pivotally mounted on the first chain link 3A. If the chain 3 is in its end position as shown in this drawing, the catch lever 20 engages with its catch nose 20A a recess 22 provided in the slide member 10A. By means of this catch lever 20, it is ensured that another first pallet P slides on the slide member 10A and its smooth surface, respectively, over the chain links upon loading, without entraining thereby the chain 3.

Only if the front face of the pallet P abuts against the catch lever 20, the catch lever 20 is rotated around its axis of rotation due to its inclined front face that faces the pallet P, whereby the catch nose 20A is raised in the direction of the arrow 21 and is released from the recess 22. Thereafter, the chain 3 is entrained by the pallet P, whereby the catch lever 20 is the entrainment device.

In order to ensure a non-positive connection between the pallet and the chain 3 even upon unloading the last pallet, after the central floorboard B2 has left the chain 3, that chain link which is next to the chain links having a smooth surface is provided with an entrainment device 13.

What is claimed is:

1. A conveying apparatus for shelf storage facilities, said conveying apparatus comprising:

two deflectors, a first deflector located near a loading/unloading end of said conveying apparatus, a second deflector located near an end remote to said loading/unloading end, a stationary buffer located near said second deflector; and two elongated, parallel conveying means for receiving and storing goods mounted on pallets, each of said conveying means comprising a roller chain and a rope, said roller chain including a first plurality of chain links and a second plurality of chain links, said roller chain having two end links, said end links being interconnected by a rope to form an endless loop, said first plurality of chain links having means for ensuring a non-positive connection between said conveying means and a pallet, said second plurality of chain links being located adjacent said loading/unloading end of said conveying apparatus prior to a pallet being placed on said conveying means, said second plurality of chain links having a smooth upper surface, said second plurality of chain links extending from a first end link of said roller chain and interconnecting with said first plurality of chain links, said first plurality of chain links extending to a second end link of said roller chain, each of said conveying means mounting on said deflectors and being displaceable upon said deflectors, each of said conveying means having an end stop member, said end stop member being located near said second end link of said roller chain, each of said end stop members abutting against said stationary buffer to limit displacement of said roller chain in an unloading direction and to align said conveying means for receiving a pallet.

2. The conveying apparatus as in claim 1 further being defined by:

said second plurality of chain links extending from said first end link of said roller chain to an entrainment device.

3. The conveying apparatus as in claim 1 further being defined by:

said conveying means having a catch member, said catch member extending from an end link adjacent said second plurality of chain links, said catch member stopping said conveying means near said loading/unloading end of said conveying apparatus.

4. The conveying apparatus as in claim 3 further being defined by:

said catch member being a rotatable catch lever with a catch nose that cooperates with a recess in a slide member.

5. The conveying apparatus as in claim 4 further being defined by:

said catch lever towering above said second plurality of chain links and being rotatable about an axis such that a pallet loaded onto said second plurality of chain links abuts against said catch lever and rotates said catch lever to release said catch nose from said recess.

6. The conveying apparatus as in claim 2 further being defined by:

said entrainment device being located on a chain link of said first plurality of chain links that abuts said second plurality of chain links.

7. The conveying apparatus as in claim 1 further being defined by:

a stationary slide member at least partially extending above said loading/unloading end of said conveying apparatus, an upper side of said stationary slide member extending at a height above said smooth upper surface of said second plurality of chain links.

8. The conveying apparatus as in claim 7 further being defined by:

said upper side of said stationary slide member extending at a height at least partially below the means for ensuring a non-positive connection with a pallet located on said first plurality of chain links.

9. The conveying apparatus as in claim 1 further being defined by:

said means for ensuring a non-positive connection with a pallet located on said first plurality of chain links being acute projections.

10. The conveying apparatus as in claim 1 further being defined by:

said second plurality of chain links comprising at least four chain links.

* * * * *